United States Patent [19]

Fox, Jr.

[11] Patent Number: 4,610,033
[45] Date of Patent: Sep. 2, 1986

[54] INSULATOR WITH FIBER OPTIC COMMUNICATION CHANNEL

[75] Inventor: Frederick L. Fox, Jr., Wadsworth, Ohio

[73] Assignee: Harvey Hubbell Incorporated, Orange, Conn.

[21] Appl. No.: 681,799

[22] Filed: Dec. 14, 1984

[51] Int. Cl.$^4$ .............................................. H04B 9/00
[52] U.S. Cl. ..................... 455/612; 174/139; 174/179; 324/96; 350/96.23
[58] Field of Search ................. 455/612, 610; 324/96; 174/139, 179; 350/96.23

[56] References Cited

U.S. PATENT DOCUMENTS

| | | | |
|---|---|---|---|
| 3,485,940 | 12/1969 | Perry et al. | 324/96 |
| 3,506,833 | 4/1970 | Von Willisen | 324/96 |
| 3,685,567 | 8/1972 | Orgeret | 324/96 |
| 3,898,372 | 8/1975 | Kalb | 174/179 |

FOREIGN PATENT DOCUMENTS

| | | | |
|---|---|---|---|
| 2716922 | 10/1978 | Fed. Rep. of Germany | 350/96.23 |
| 3046042 | 7/1982 | Fed. Rep. of Germany | 350/96.23 |
| 3207306 | 9/1983 | Fed. Rep. of Germany | 174/177 |
| 3205616 | 9/1983 | Fed. Rep. of Germany | 350/96.23 |
| 1114995 | 5/1968 | United Kingdom | 324/96 |

Primary Examiner—Joseph A. Orsino, Jr.
Attorney, Agent, or Firm—Jerry M. Presson; Walter C. Farley

[57] ABSTRACT

An insulator for supporting a high voltage transmission line or other electrical device is provided with an optical fiber extending through the insulator between housings at opposite ends of the array of sheds. The optical fiber, or a plurality of such fibers, can be connected to external fibers in the end housings to form a communication path between a sensor on the electrical device and a ground location or to form a communication link between two ground locations, using a fiber extending along the transmission line as the intermediate portion of the communication link.

4 Claims, 6 Drawing Figures

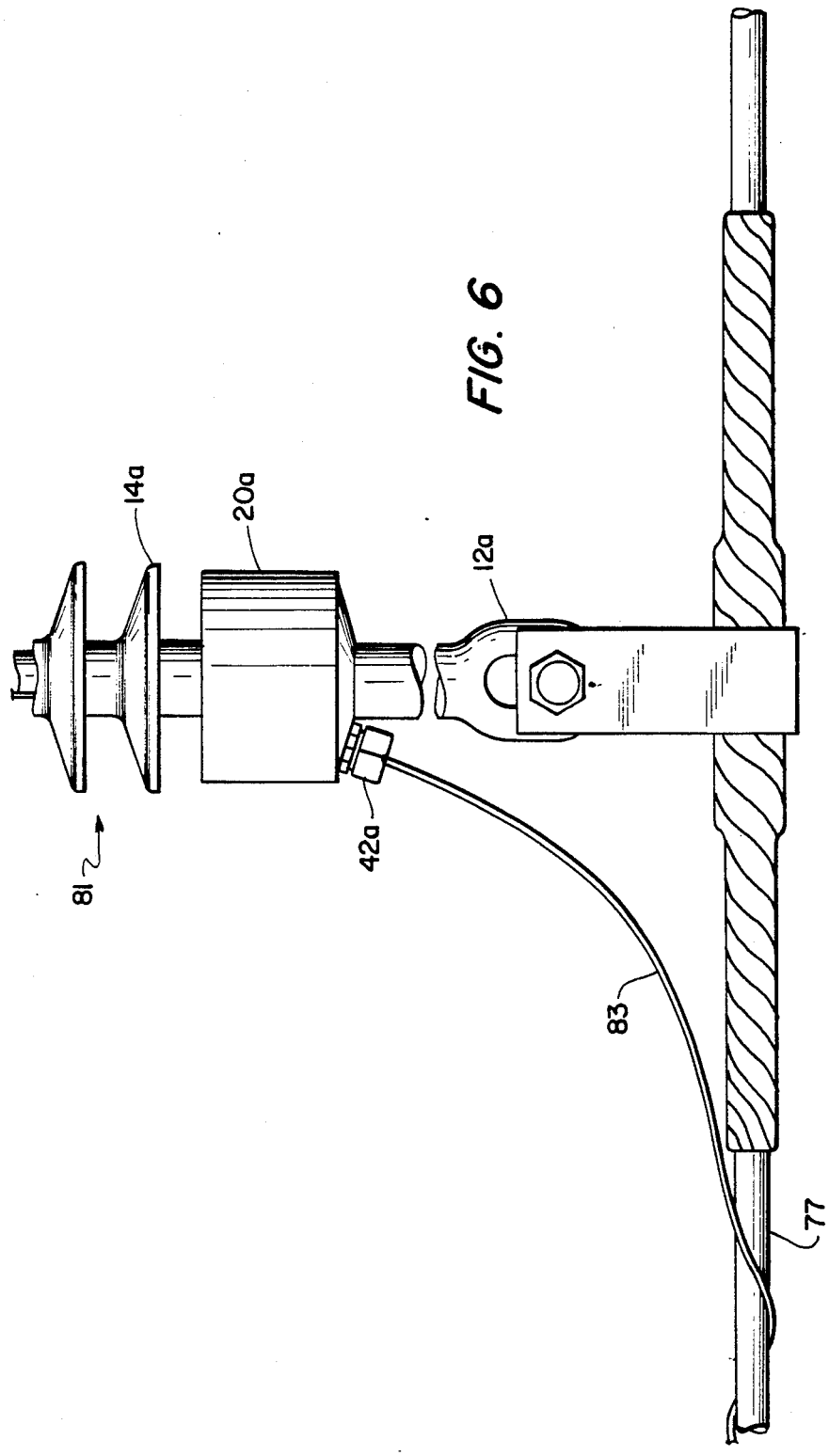

INSULATOR WITH FIBER OPTIC COMMUNICATION CHANNEL

This invention relates to insulators of the type commonly used to support high voltage transmission lines or other electrical components and, in particular, to an insulator structure incorporating one or more optical fibers therein for communication purposes.

BACKGROUND OF THE INVENTION

Insulators are commonly used for supporting high voltage transmission lines and other components and keeping such components in spaced relationship with respect to other supporting structures such as transmission line towers, housings, and the like which are normally at or very near ground potential. A typical example of an insulator of this general type is shown in U.S. Pat. No. 3,898,372, Kalb. Modern insulators of this type generally include a central rod of an insulating material such as fiberglass, the ends of the rod being firmly attached to end members which are normally electrically conductive. The rod and the end members comprise the primary load bearing structure, the rod being very strong and the end members being crimped or otherwise fixedly attached to the rod ends. The rod is usually surrounded by a series of skirted members called "weathersheds" or simply "sheds" which are made of a good insulating material, originally ceramic but more recently a rubber-like polymeric material such as EPM. The sheds are placed end-to-end along the rod to form a very long external surface path between the conductive end members, the length of the rod and the number of sheds being chosen in accordance with the voltage conditions in a manner which is conventional. Finally, a dielectric material is used to fill the spaces between the weather sheds and the central strength member to prevent the ingress of dirt and moisture which might form a conductive path. A material such as a silicone grease is suitable for this purpose.

In use, such insulators are mounted with the end members connected to the points between which there is, or is expected to be, a high potential difference. The insulator can be used as a hanger, supporting a transmission line with the insulator being suspended between an arm of a tower and the transmission line, or the insulator can be used as a standing member supported on a housing with the high voltage component at the upper end.

BRIEF DESCRIPTION OF THE INVENTION

An object of the present invention is to provide a modified insulator which incorporates one or more optical fibers housed in and protected by the insulator structure to provide the capability for a communication channel which is unaffected by the potential difference and which is substantially immune to effects such as electromagnetic interference which would be detrimental to any other form of communication channel.

A further object is to provide a measuring technique for sensing and measuring physical characteristics of a high voltage component, such as temperature, voltage, current, and the like, using an insulator having one or more optical fibers incorporated therein to convey the sensed information to a more convenient location.

Yet another object is to provide a communication technique which can be used between locations geographically separated from each other but relatively close to a power transmission line using insulators having optical fibers incorporated therein and a transmission line having one or more optical fibers extending between support locations.

In one aspect, the invention comprises an insulator apparatus having a central electrically nonconductive strength member with attachment fittings at opposite ends of the strength member for attaching the member to devices which are to be physically separated from each other and which are at different electrical potentials. A plurality of sheds are provided in end-to-end relationship along the strength member, each shed surrounding the strength member. The insulator further includes at least one optical fiber extending along the strength member within the sheds to provide a communication path from one end of the insulator to the other.

In another aspect, the invention comprises an apparatus for sensing a physical characteristic of a high voltage comonent and for providing an indication of the value of the sensed characteristic at a location substantially closer to ground potential which includes an elongated insulator having a central portion of electrically nonconductive material, end members connected respectively to the high voltage component and to a support point and an optical fiber extending through the central portion. A sensor is connected to the high voltage component for sensing the characteristic and for producing a variable electromagnetic signal representative of values of the characteristic to be measured. The electromagnetic signal is coupled to the optical fiber at the high voltage end of the insulator and the apparatus further includes means coupled to the optical fiber at the ground potential end of the insulator for receiving the electromagnetic signal and for providing an indication of the values of the characteristic.

In a further aspect, the invention includes a communications link between two locations along an electrical power transmission line which includes a transmitter at one location for producing electromagnetic signals of a type which can be transmitted along an optical fiber and a receiver at the other location for receiving electromagnetic signals. At each location there is a structure for supporting the transmission line, each such structure including a supporting insulator having an elongated central portion of electrically nonconductive material, end members connected respectively to the transmission line and to a support point and an optical fiber extending through the central portion. At least one optical fiber extends along the transmission line between the supporting insulators, the fiber being optically coupled at each end to the fibers in the insulators. A means for delivering electromagnetic signals from the transmitter to the optical fiber in one of the support insulators is provided, and, at the other location, there is means for delivering electromagnetic signals from the optical fiber in the other of the support insulators to the receiver.

In order that the manner in which the foregoing and other objects are attained in accordance with the invention can be understood in detail, particularly advantageous embodiments thereof will be described with reference to the accompanying drawings, which form a part or this specification, and wherein:

FIG. 6 is an enlarged view of a portion of FIG. 5.

DETAILED DESCRIPTION OF PREFERRED EMBODIMENTS

Figure 1:
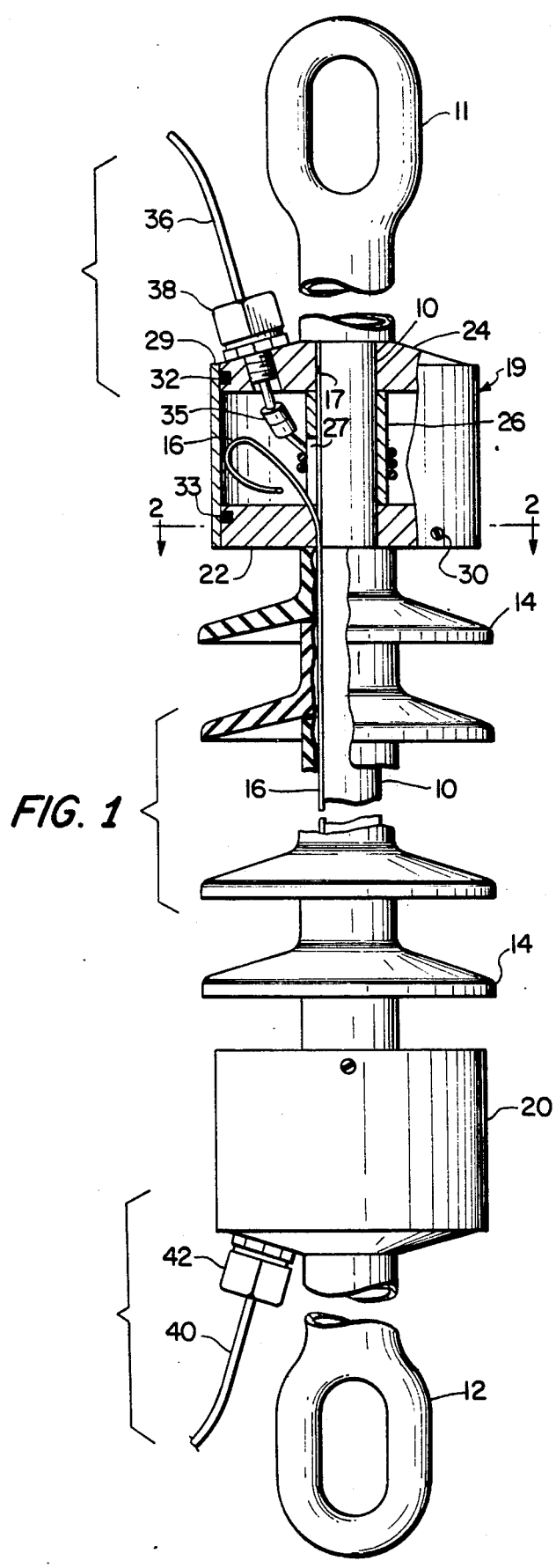
FIG. 1 is a partially foreshortened side elevation of an insulator in accordance with the invention, partly in section.

Referring first to FIG. 1, it will be observed that the basic structure of the apparatus is similar in overall form to the insulator shown in the previously mentioned Kalb patent but with a number of significant differences. The insulator structure includes a central strength member comprising a fiberglass rod 10 to which end members 11 and 12 are firmly attached in a conventional fashion. A plurality of sheds 14 surround the central portion of rod 10 and are placed in end-to-end relationship.

It will be observed that there are some structural differences in the configuration of the sheds themselves from that shown in the Kalb patent, one difference being that the sheds are not recessed so as to be in a telescoping relationship. In addition, they are not placed on the rod in as tight an arrangement as described in Kalb. Furthermore, it is preferred that the sheds be adhered to each other when the insulator is initially produced. However, this is a technical detail which does not relate directly to the present invention.

In accordance with the invention, the structure of FIG. 1 has an optical fiber 16 which extends longitudinally along rod 10 and preferably lies in a groove 17 which extends along the length of the rod. At opposite ends of the rod adjacent end members 11 and 12 are housings 19 and 20 into which fiber 16 extends. The housings are substantially identical, the interior of housing 20 being the same as the illustrated interior of housing 19.

Each housing includes a base disc 22 of an electrically conductive material such as aluminum and a top disc 24 of a similar material, each disc having a central opening through which rod 10 passes. An intermediate tube 26 of the same material is adhered at its opposite ends to the inner surfaces of discs 22 and 24. Tube 26 is provided with an axially extending slot 27 which extends upwardly from the lower end of the tube and is positioned adjacent slot 17 so that fiber 16 can extend from slot 17 into discs 22 and 24. This volume is closed by an external cylindrical sleeve 29, also preferably of aluminum, the sleeve being held in position by one or more set screws 30. O-rings 32 and 33 are provided in annular slots in the peripheries of discs 22 and 24 to form a seal against the inner surface of sleeve 29 to prevent moisture from entering the interior of the housing.

Within the housing, fiber 16 is attached to a conventional optical fiber connector 35 which couples fiber 16 to an external fiber 36. Fiber 36 enters the housing through a water-tight bulkhead connector 38 which is conventional in nature and which is threadedly fastened into an opening in disc 24. The purpose of connector 38 is to surround and engage the outer surface of fiber 36 with an elastomeric body under pressure so as to prevent moisture from entering housing 19. A suitable device for this purpose is manufactured by the Kellems Division of Harvey Hubbell Incorporated and is identified as Catalog No. SHC-1023.

At the other end of the insulator, optical fiber 16 emerges into the interior of housing 20 and is connected to the end of a fiber 40 which passes inwardly through the upper disc of housing 20 through a fitting 42 which is the same as connector 38.

Figure 2:
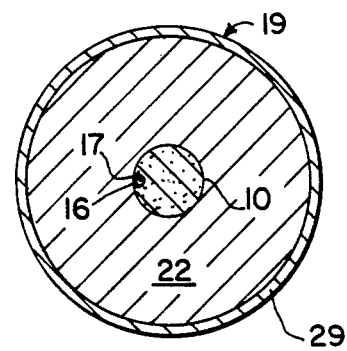
FIG. 2 is a transverse sectional view along line 2—2 FIG. 1.
Figure 3:
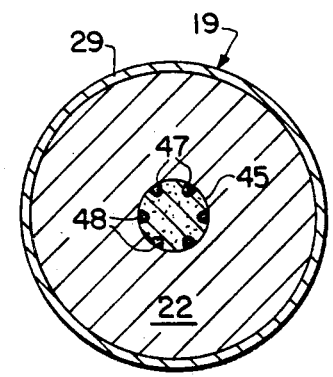
FIG. 3 is a sectional view similar to FIG. 2 of a further embodiment of an insulator in accordance with the invention.

As illustrated in FIG. 3, the insulator can be provided with a number of fibers rather than only one as shown in FIGS. 1 and 2. In FIG. 3, housing 19 surrounds a rod 45 which is provided with six longitudinally extending grooves 47, each groove containing an optical fiber 48. As will be recognized, with an arrangement of that type, six connectors such as connector 35 would be used to couple the optical fibers to external fibers. Alternatively, one or more multiple-fiber connectors could be used. Additionally, it would be necessary to provide a plurality of bulkhead connectors 38 or a different form of bulkhead connector capable of dealing with a plurality of fibers.

The article shown in FIGS. 1 and 2, or in the embodiment of FIG. 3, can be produced as a complete entity except for the connection to external fibers 36 and 40. Thus, in the factory, the entire insulator can be assembled including rod 10, end members 11 and 12, housings 19 and 20, and sheds 14 with fiber 16 or fibers 47 extending along the strength member in grooves provided for that purpose. The region within sheds 14 around rod 10 can be filled with the necessary sealing and adhesive material and the completed product, after curing of any polymeric adhesives or sealants used, can be shipped as a substantially complete article.

Then, at the location at which the device will be used, the final assembly can be accomplished by connecting end members 11 and 12 to the structural supports and electrical components with which it is to be associated and fibers 36 and 40 can be inserted through the bulkhead connectors and connected to the ends of fiber 16. For this purpose, the set screw holding sleeve 29 is loosened or removed and the sleeve is axially moved to expose the interior of the housing. Fiber 36 and its bulkhead connector are then inserted into the opening in disc 24 and the fiber is connected to the appropriate connector. Sleeve 29 is then restored to its position and restrained by reinserting and tightening set screw 30. A dessicant can also be provided within housing 19. As seen in FIG. 1, an extra length of fiber 16 is advantageously included in the housing for convenience in handling and to provide extra fiber in the event that an end segment breaks off while attaching a connector.

Figure 4:
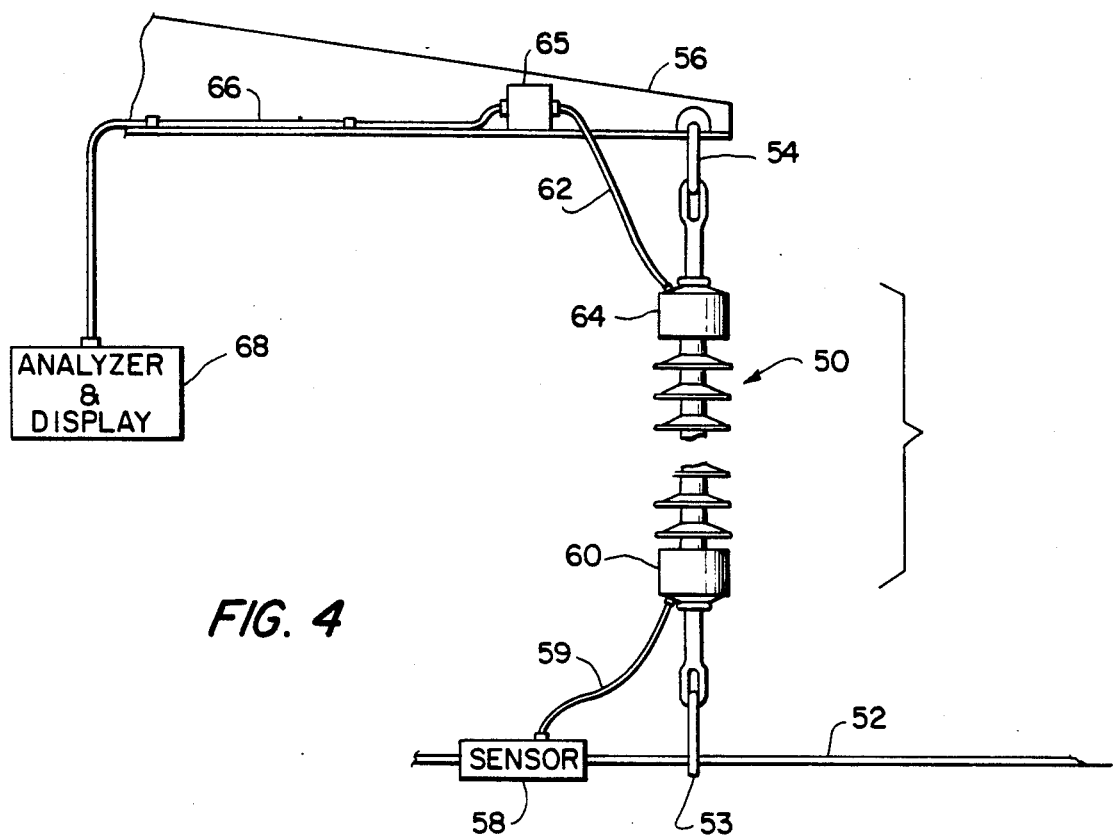
FIG. 4 is a schematic side elevation and block diagram illustrating a further embodiment of an apparatus in accordance with the invention.

The manner in which the assembly is used and the locations to which fibers 36 and 40 extend depend upon the particular use to which the insulator is to be put. An example of such a use is illustrated in FIG. 4 in which an insulator assembly indicated generally at 50 of the type illustrated in FIG. 1 is being used to support a transmission line 52, only a small portion of which is shown. The lower end of the assembly is coupled by a shackle 53 to the transmission line and the upper end is connected by a shackle 54 to a support arm 56 which will be assumed to be a portion of a transmission line supporting tower.

Transmission line 52 is provided with a sensor 58 from which an optical fiber 59 emerges, fiber 59 being connected to the internal fiber within insulator 50 inside of end housing 60 in the manner described in connection with FIG. 1. At the other end of the insulator, fiber 62 extends into housing 64 and is optically coupled by a connector such as connector 35 to the other end of the fiber within the insulator. Fiber 62 extends to a junction box 65 at which it is joined to a fiber 66 which can be a multi-fiber cable including fibers from other insulators, the cable being connected to an analyzer and display unit 68.

For purposes of this illustration, it will be assumed that the current passing through transmission line 62 is to be monitored. It will be recognized, however, that any physical characteristics of the transmission line such as its temperature, vibration characteristics or the like, could be the subject of the measurement. In the current measurement, sensor 58 would include a current transformer and a conventional transducer for converting the electrical signal produced by the current transformer into an electromagnetic signal of a type which can be transmitted through the optical fiber. This can be visible light modulated by pulses having a variable repetition rate proportional to the magnitude of the current being sensed. Alternatively, a code converter can be used to convert the sensed values into a digital pattern recognizable as representing various values of current. The optical pulses produced thereby are coupled into fiber 59 and into the fiber within insulator 50 and thus to fibers 62 and 66 for delivery to analyzer 68 which decodes the signals and produces an indication of the values which can be in the form of meter readings or a more permanent record such as that produced on a strip chart recorder.

As will be recognized, the analyzer and display unit can be at the base of a transmission tower or in a substation structure at a convenient location, and at a potential which is substantially ground, while the measurement is continuously or repetitively being made by the sensor coupled to a transmission line which may be many thousands of volts above ground potential. The measurements can be made at the convenience of the operators or continuously recorded and checked from time to time. Although substantial fluctuations in the conditions at the location of sensor 58 can occur, including lightening disturbances, radio frequency fields from a variety of sources, and other electromagnetic signals in radio frequency or lower ranges as carried along the transmission lines can exist, the existence of such signals has substantially no impact on the short wave length electromagnetic signals transmitted by the optical fibers. The signals can, of course, be visible light or at any other wave length depending upon the characteristics of the chosen fibers and of the transducers at the opposite ends thereof.

Figure 5:
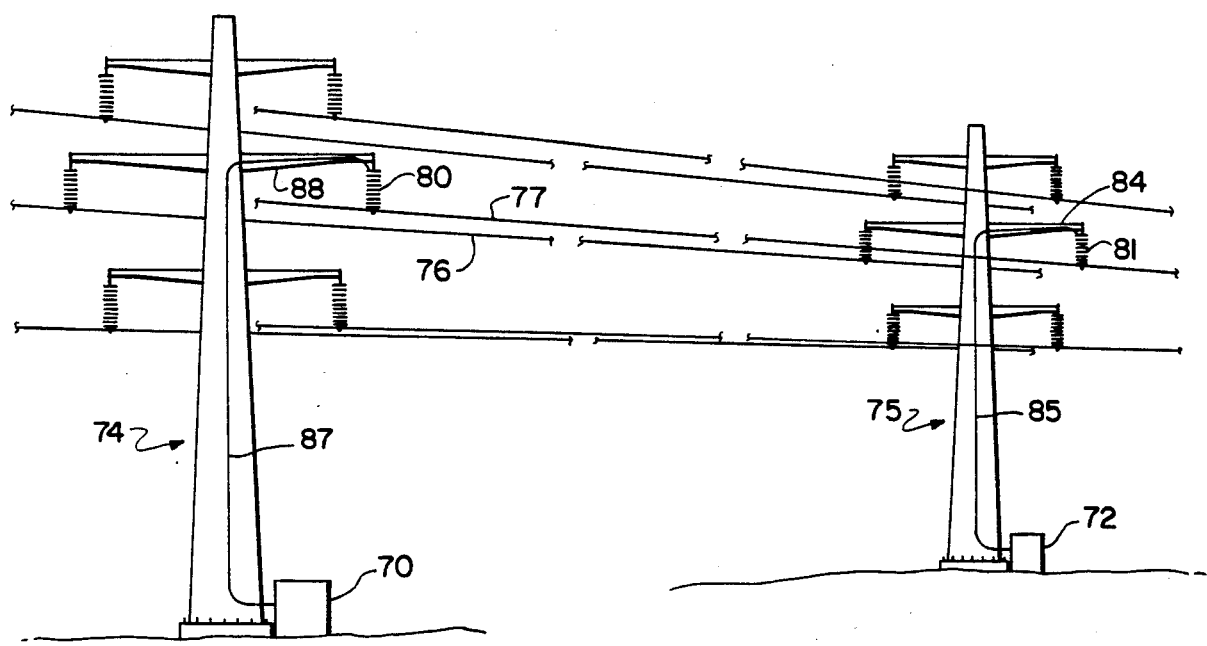
FIG. 5 is a schematic perspective view of a portion of a power transmission line system incorporating features of the present invention.

A further embodiment in accordance with the invention is illustrated in FIG. 5 wherein a communication link is established between two geographically separated locations 70 and 72. It will be assumed that these locations are separated from each other by a distance involving many miles, although such separation is by no means necessary. Furthermore, it will be assumed that the locations are adjacent a power transmission line path including support towers 74 and 75 which each support transmission lines including lines 76 and 77. There could, of course, be many intervening support towers.

Each of the transmission lines is supported by insulators of the general type shown in FIG. 1, but it will be assumed that only transmission line 77 is supported by insulators having optical fibers therein, these being insulators 80 and 81. The segment of transmission line 77 between insulators 80 and 81 has an optical fiber 83 extending along the high voltage cable, more clearly seen in FIG. 6. At insulator 81, fiber 83 enters housing 20 at the bottom of the insulator through a bulkhead connector 42 and connects to an internal fiber 16 as described in connection with FIG. 1. At the top of insulator 81, fiber 16 is connected to a fiber 85 which passes along a support arm 84 of tower 75, down the tower and to location 72.

At insulator 80, the other end of fiber 83 is connected in the same way to the fiber 16 within insulator 80, the other end of which is connected to a fiber 87 which passes along a support arm 88 and down tower 74 to location 70. At each of locations 70 and 72 there can be a transmitter or receiver, or both, each transmitter being of a conventional type capable of producing modulated signals of electromagnetic energy at wavelengths which can be carried by the fibers. Similarly, each receiver is of a known type for receiving electromagnetic signals, the specific types of transmitter and receiver being selected on the basis of the type of communication to be employed.

While certain advantageous embodiments have been chosen to illustrate the invention, it will be understood by those skilled in the art that various changes and modifications can be made therein without departing from the scope of the invention as defined in the appended claims.

What I claim is:

1. An insulator apparatus comprising a central electrically nonconductive strength member;

attachment fitting at opposite ends of said strength member for attaching said member to devices which are to be physically separated from each other and which are at different electrical potentials;

first and second housings surrounding and fixedly attached to opposite ends of said strength member between said attachment fittings;

a plurality of sheds in end-to-end relationship along said strength member, each said shed surrounding said strength member;

means defining a groove extending along an outer surface of said strength member; and at least one optical fiber extending along said strength member in said groove and within said sheds to provide a communication path from one end of the insulator to the other, each of said housing including first and second axially spaced end members fixedly attached to said strength member, a generally cylindrical sleeve surrounding said end members and the space therebetween, thereby forming a closed chamber, and means in the axially outermost one of said end members for sealingly engaging an external optical fiber extending therethrough for introducing said external fiber into the interior of said chamber.

2. An apparatus according to claim 1 wherein said insulator further includes means in each said housing for connecting the fiber within said insulator to said external fiber.

3. An apparatus according to claim 1 wherein said insulator includes a plurality of fibers.

4. An apparatus according to claim 3 wherein said strength member includes an elongated rod having means defining a plurality of substantially parallel grooves uniformly distributed around and extending longitudinally along said rod, each said groove being dimensioned to receive an optical fiber.

* * * * *